United States Patent
Boshoff et al.

(10) Patent No.: US 10,636,117 B2
(45) Date of Patent: Apr. 28, 2020

(54) DISTORTION VIEWING WITH IMPROVED FOCUS TARGETING

(71) Applicant: Flow Labs, Inc., Menlo Park, CA (US)

(72) Inventors: Hendrik Frans Verwoerd Boshoff, Stellenbosch (ZA); Willem Morkel Van Der Westhuizen, Stellenbosch (ZA); Jan Pool, Stellenbosch (ZA); Adri Smuts, Durbanville (ZA)

(73) Assignee: Flow Labs, Inc., Menlo Park, CA (US)

( * ) Notice: Subject to any disclaimer, the term of this patent is extended or adjusted under 35 U.S.C. 154(b) by 361 days.

(21) Appl. No.: 14/780,162

(22) PCT Filed: Mar. 25, 2014

(86) PCT No.: PCT/ZA2014/000013
§ 371 (c)(1),
(2) Date: Sep. 25, 2015

(87) PCT Pub. No.: WO2014/161011
PCT Pub. Date: Oct. 2, 2014

(65) Prior Publication Data
US 2016/0042495 A1 Feb. 11, 2016

(30) Foreign Application Priority Data
Mar. 26, 2013 (ZA) .................................. 2013/02248

(51) Int. Cl.
*G06F 3/0484* (2013.01)
*G06T 3/40* (2006.01)
*G06F 3/0481* (2013.01)

(52) U.S. Cl.
CPC ............ *G06T 3/40* (2013.01); *G06F 3/04812* (2013.01); *G06F 3/04842* (2013.01); *G06F 2203/04805* (2013.01); *G06F 2203/04806* (2013.01)

(58) Field of Classification Search
CPC .. G06F 3/0484; G06F 3/0481; G06F 3/04812; G06F 2203/04805
See application file for complete search history.

(56) References Cited

U.S. PATENT DOCUMENTS

| | | | |
|---|---|---|---|
| 2009/0080698 A1* | 3/2009 | Mihara | G06F 17/30784 382/103 |
| 2010/0100849 A1* | 4/2010 | Fram | G06F 3/0236 715/835 |

(Continued)

OTHER PUBLICATIONS

PCT International Search Report, PCT Application No. PCT/ZA2014/000013, dated Aug. 5, 2014, 2 pages.

(Continued)

*Primary Examiner* — Andrea C Leggett
(74) *Attorney, Agent, or Firm* — Fenwick & West LLP

(57) ABSTRACT

The invention provides a method for human-computer interaction (HCI) on a graphical user interface (GUI). The method includes the steps of displaying a plurality of objects positioned in relation to each other and in relation to the display window; determining user input; distorting at least one of the position relations according to a magnification function with a focal dip, where the focal position of the magnification function is controllable by the user input; and updating the distortion whenever the relevant user input changes.

14 Claims, 13 Drawing Sheets

Interaction with 3D input via a Leap Motion Controller (visible as the small box with the blue connector), resulting in a distorted display. (Method: S&B+Lambert, m = 4, q = 1.5, focal dip calculated)

(56) References Cited

U.S. PATENT DOCUMENTS

2010/0313124 A1* 12/2010 Privault .............. G06F 3/04812
715/702
2014/0046964 A1* 2/2014 Takao ................... G06Q 30/02
707/749

OTHER PUBLICATIONS

PCT Written Opinion, PCT Application No. PCT/ZA2014/000013, dated Aug. 5, 2014, 5 pages.
PCT International Preliminary Report on Patentability, PCT Application No. PCT/ZA2014/000013, dated Jul. 9, 2015, 12 pages.
Gutwin, C., "Improving Focus Targeting in Interactive Fisheye Views," Conference on Human Factors in Computing Systems—Proceedings 2002 Association for Computing Machinery, 2002, pp. 267-274, vol. 4, No. 1.
Leung, Y.K. et al., "A Review and Taxonomy of Distortion-Oriented Presentation Techniques," ACM, Jun. 1994, pp. 126-160, vol. 1, No. 2.
Sarkar, M. et al, "Graphical Fisheye Views of Graphs," Striking a Balance, Monterey, Proceedings of the Conference on Human Factors in Computing Systems, May 3, 1992-May 7, 1992, pp. 83-91.

* cited by examiner

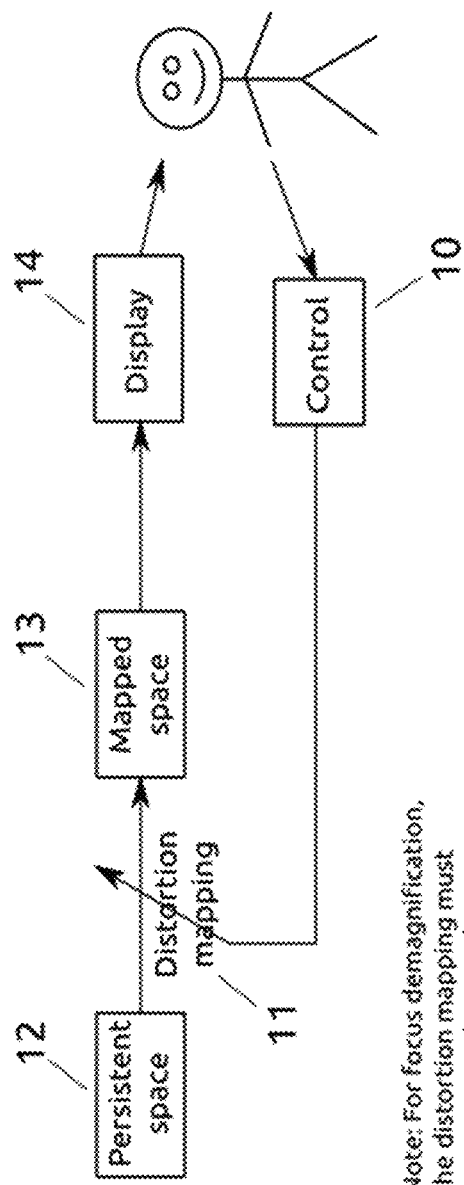
Figure 1: Distortion-based visualization loop with focus demagnification

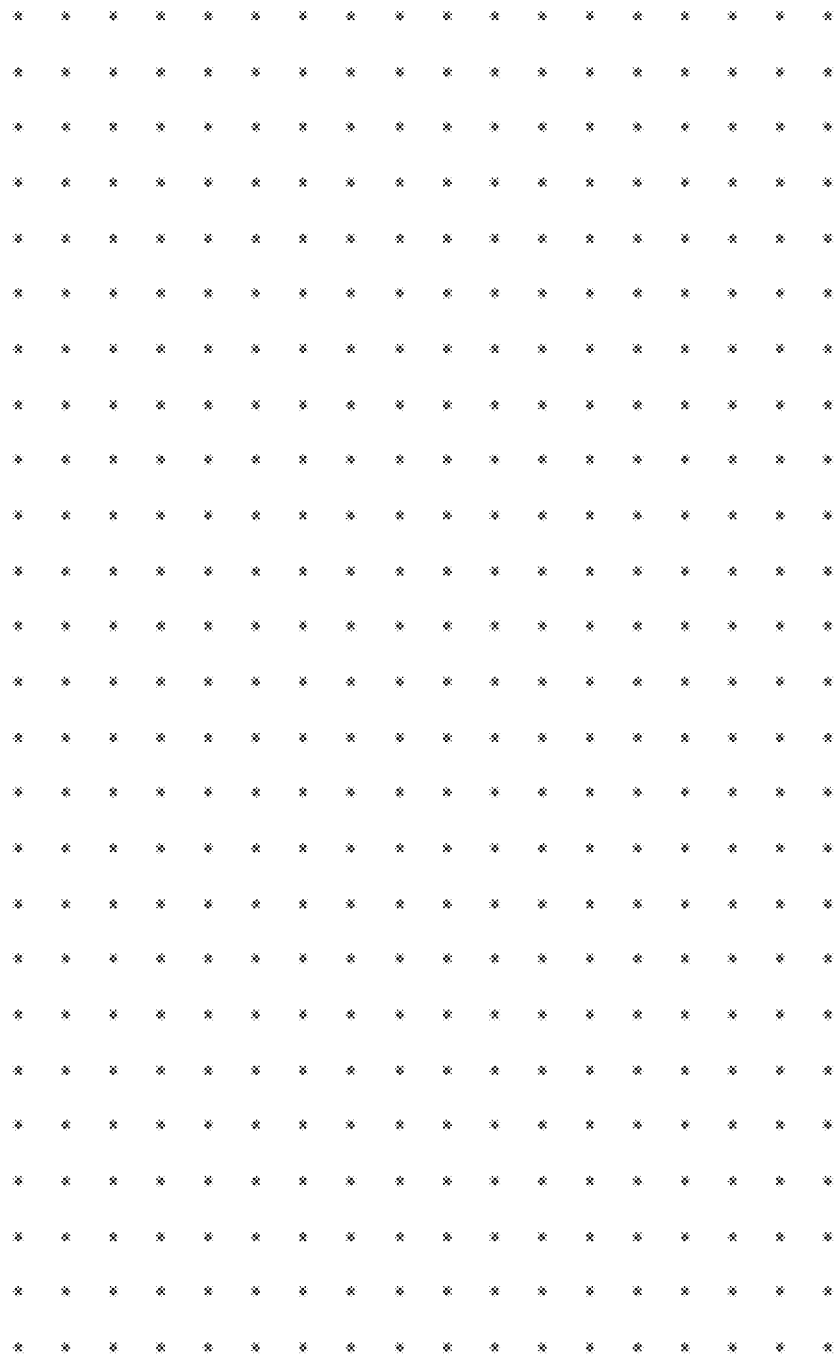
Figure 2. Undistorted display of an arrangement of objects on a 18x25 rectangular grid

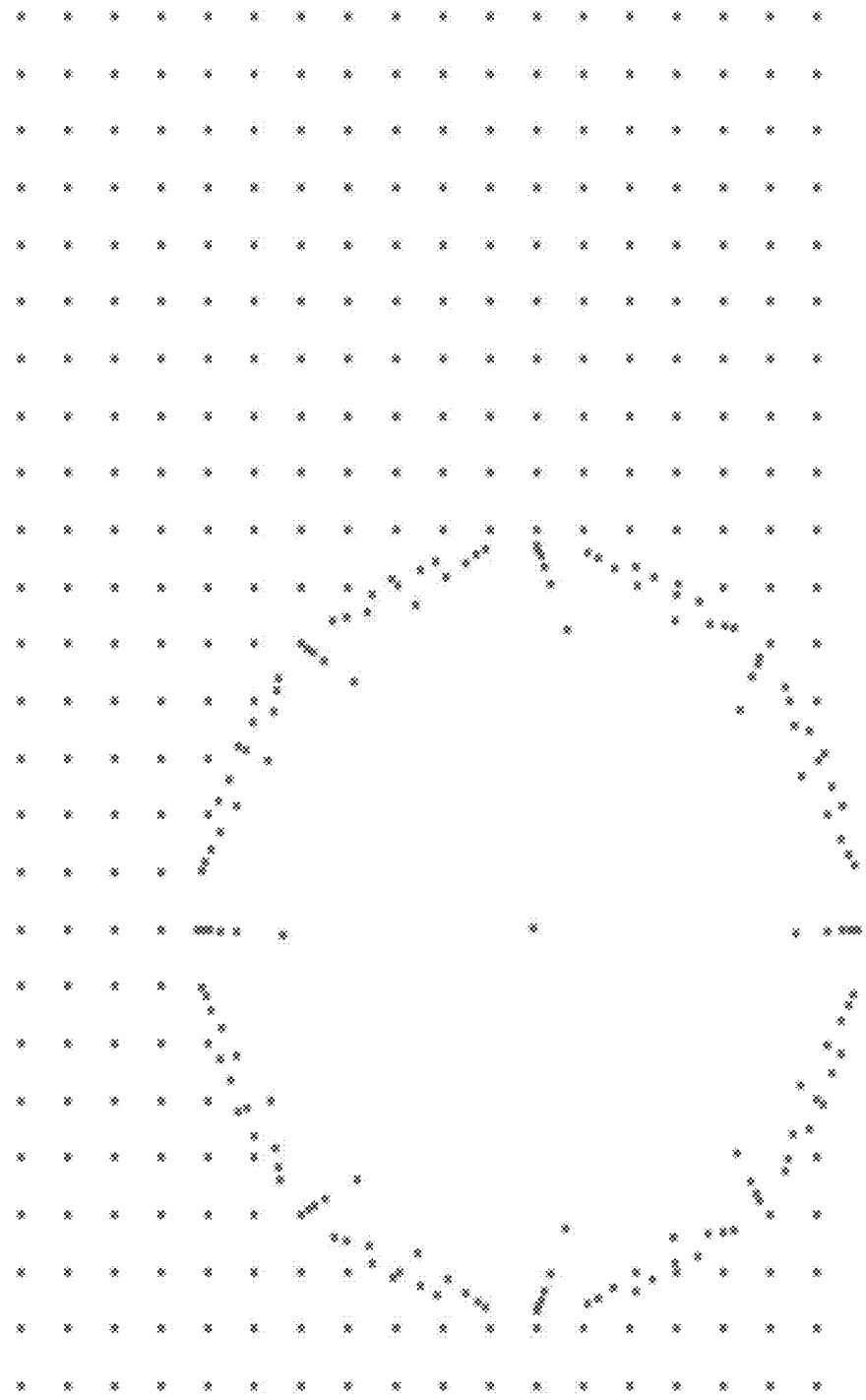
Figure 3. Distorted display of an arrangement of objects on a 18x25 rectangular grid, with the distortion based on equation (E1.1), with c = 20, d = 20 and dip radius equal to 7% of the radius of distortion

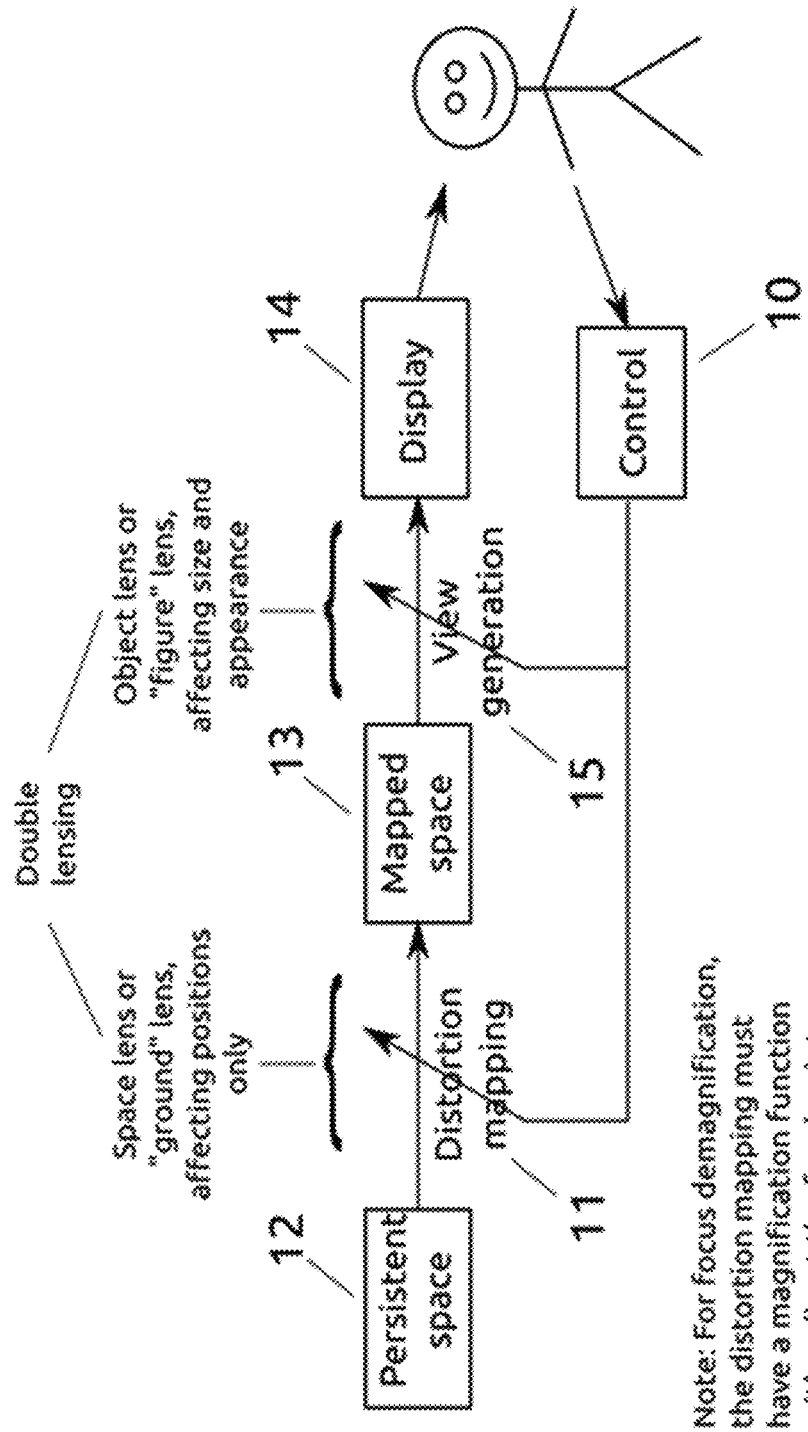
Figure 4. Distortion-based visualization loop with focus demagnification and double lensing

Figure 5. Undistorted display of an arrangement of album covers on a 13x12 rectangular grid

Figure 6. Distorted display of an arrangement of album covers on a 12x13 rectangular grid, with the space distortion as in Figure 3, and the object scaling based on equation (E2.1b)

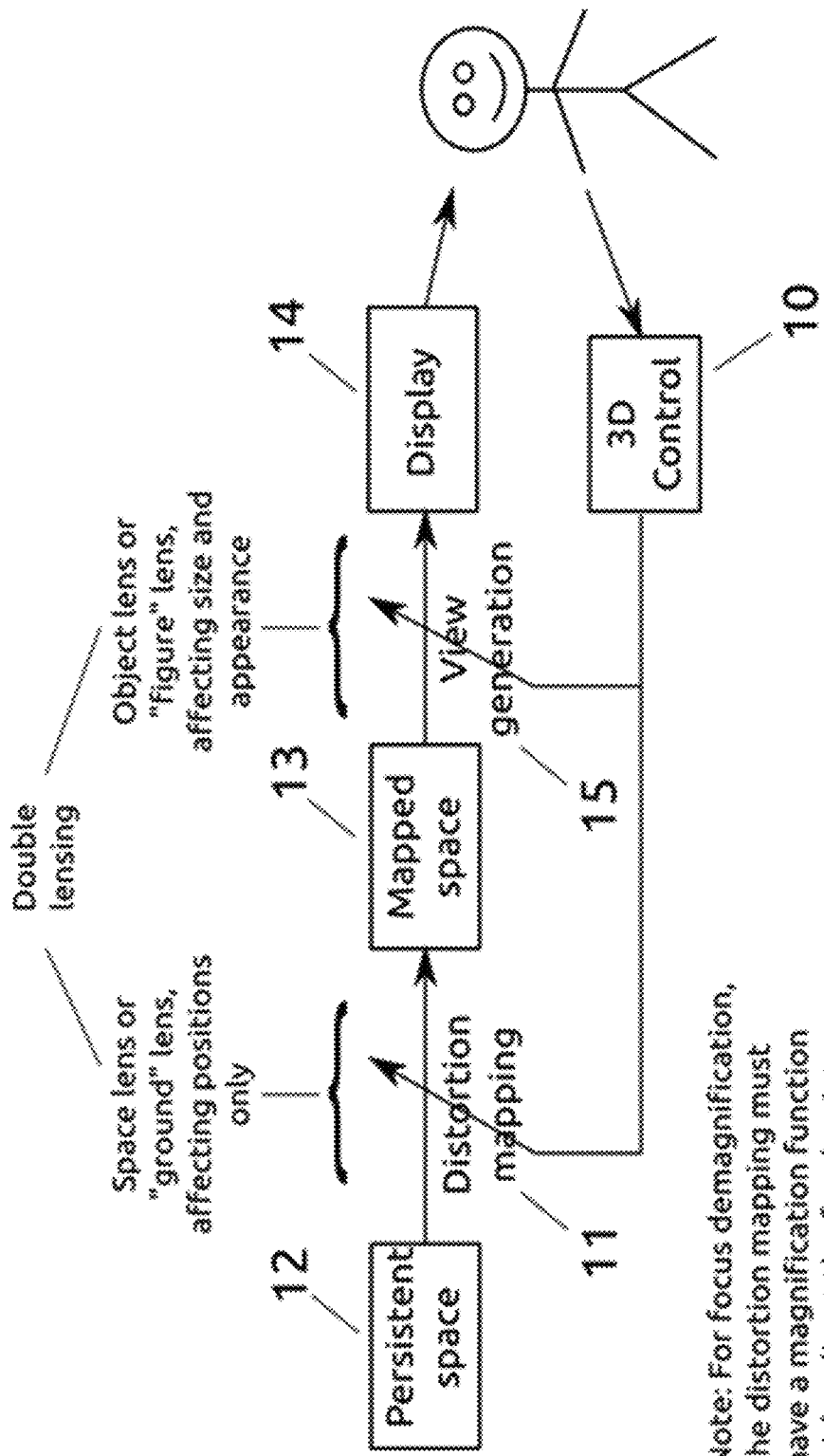
Figure 7. 3D control of focus demagnification and double lensing. Two dimensions control focus targeting, while the third controls the strength of magnification

Figure 8. Screen shot of an undistorted display arrangement of photos on a 20x15 rectangular grid

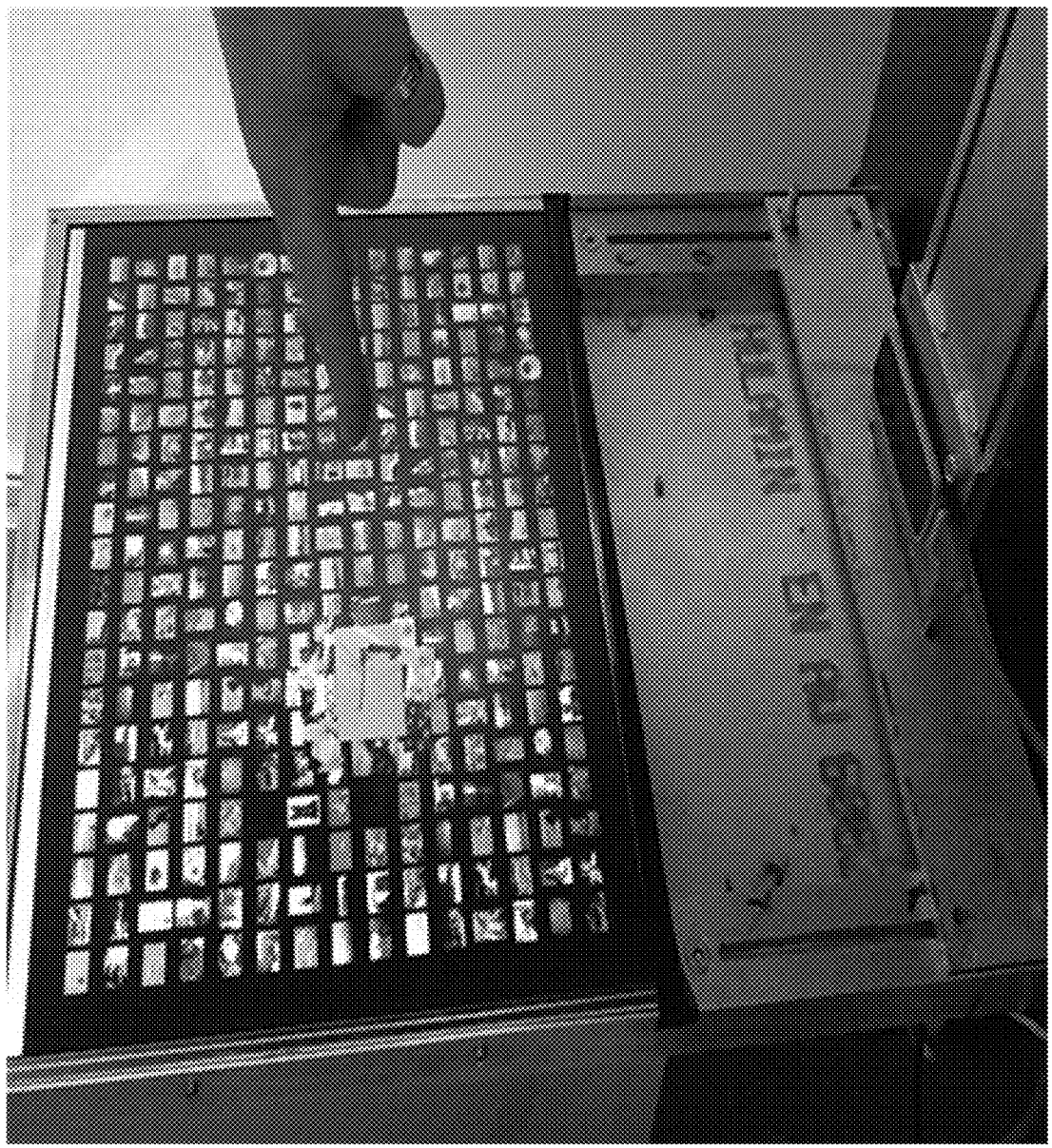
Figure 9. Interaction with 3D input via a Leap Motion Controller (visible as the small box with the blue connector), resulting in a distorted display. (Method: S&B+Lambert, m = 4, q = 1.5, focal dip calculated)

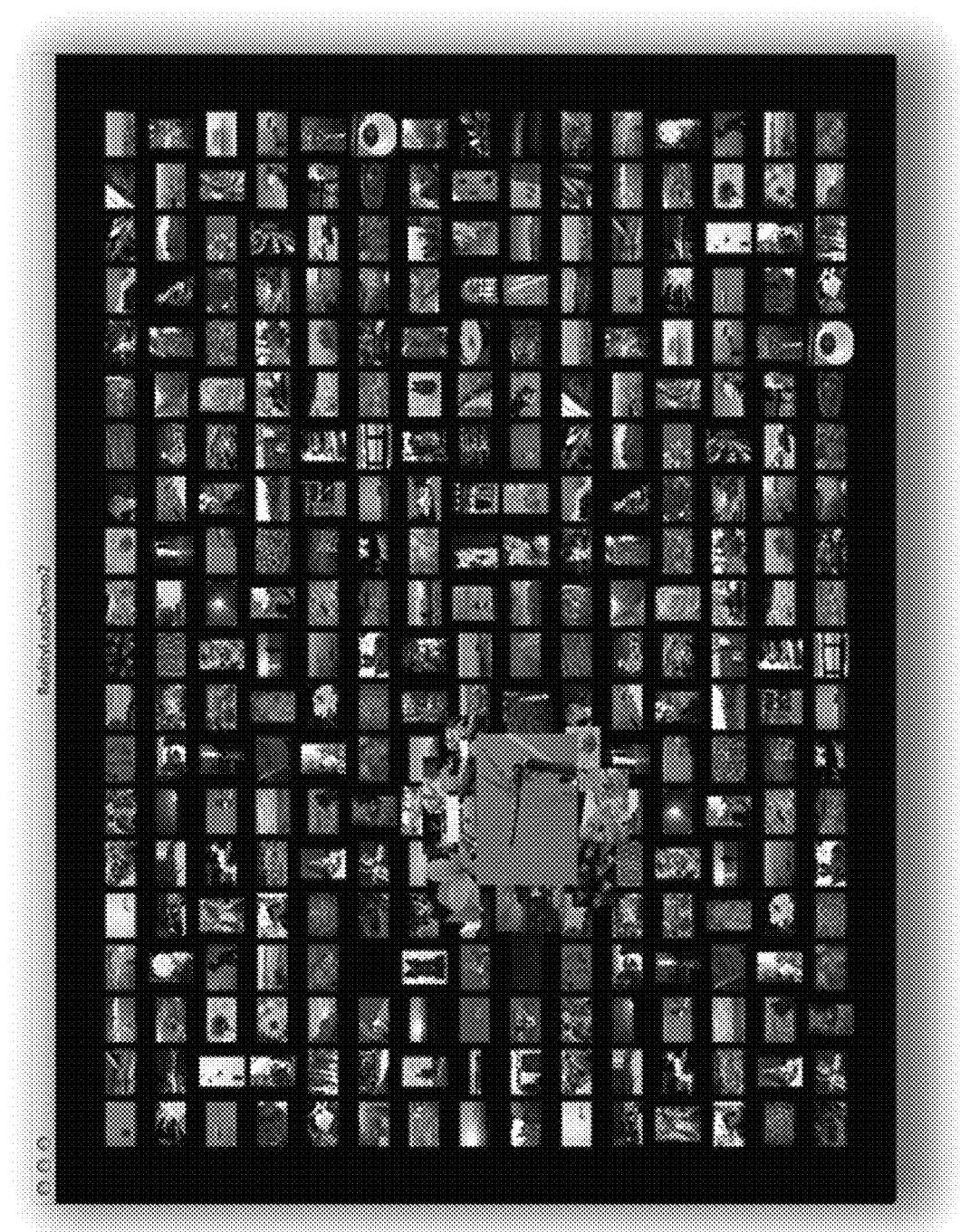
Figure 10. Screen shot of the distorted display shown in Figure 9.

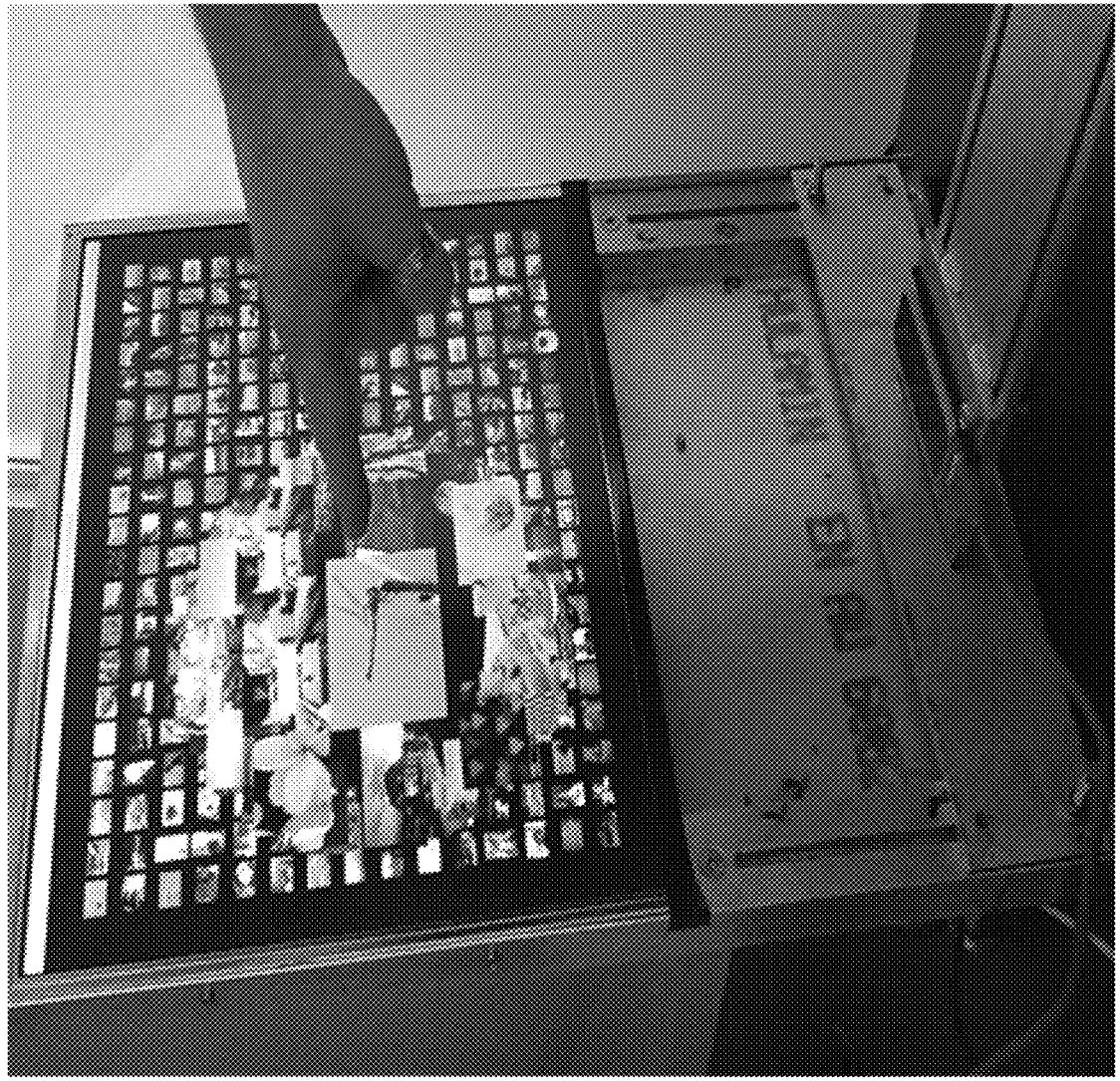
Figure 11. Interaction with 3D input, resulting in a distorted display of an arrangement of photos, where the finger moved closer to the screen relative to the position shown in Figure 9. (Method: S&B+Lambert, m = 6, q = 1.5, focal dip calculated)

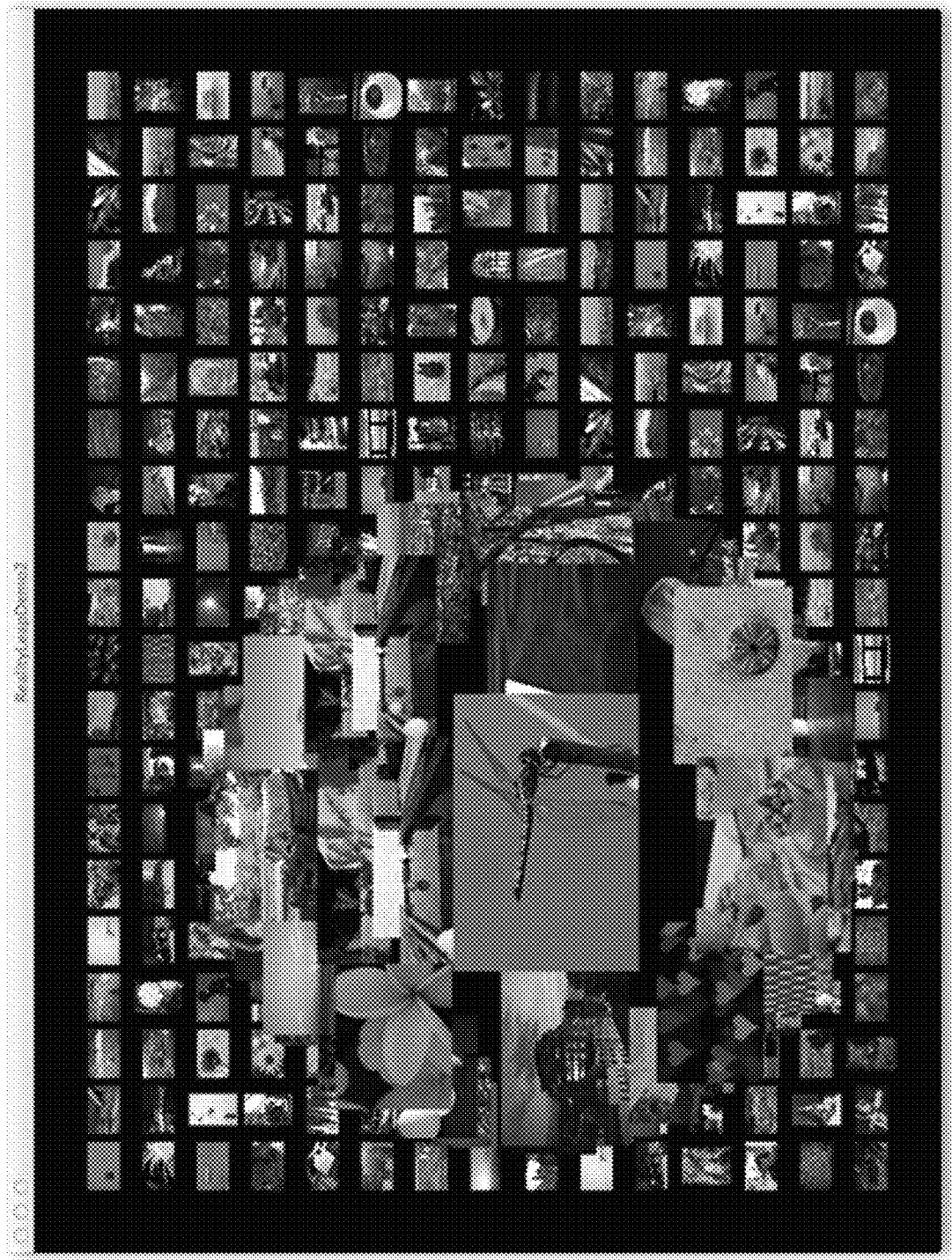
Figure 12. Screen shot of the distorted display shown in Figure 11. Note that the photo in the focus is larger, and the sizes of the photos surrounding it are larger too, compared to Figure 10.

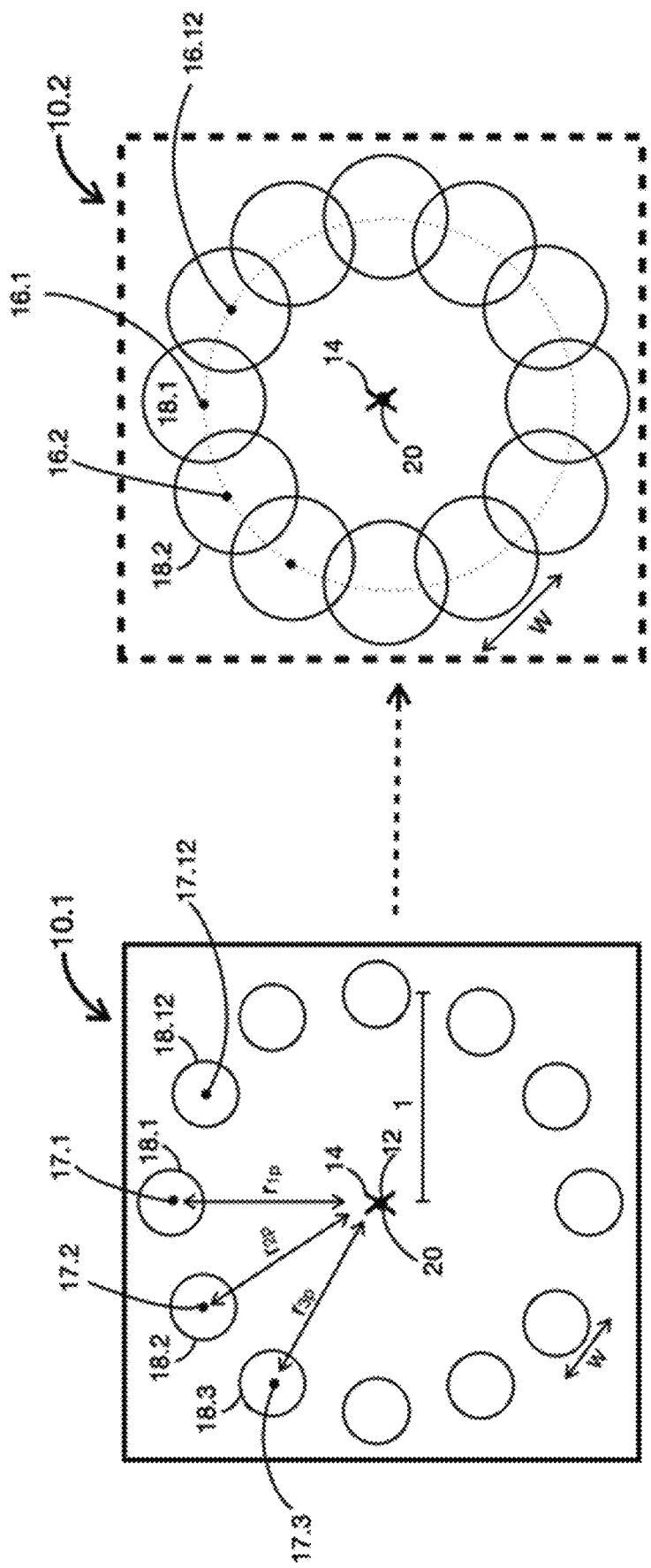
Figure 13. Interaction and display coordinates with the pointer in the neutral position

DISTORTION VIEWING WITH IMPROVED FOCUS TARGETING

TECHNICAL FIELD OF THE INVENTION

This invention relates to a method for human-computer interaction on a graphical user interface.

BACKGROUND TO THE INVENTION

Distortion viewing is a commonly used visualization technique that shows an area of interest, the focus, which is part of a larger image, the context. The focus is shown magnified, while some distorted representation of the immediate context is retained, approximately in-place around the focus. The development of distortion viewing was partly inspired by photographic fish-eye lenses and optical magnifying lenses [1, 2]. Focus+context is an in-place (distorted) spatial visualization method, as opposed to overview+detail, which is a spatially separated (undistorted) method, and zooming, which separates related (undistorted) views in time [3].

One problem with interactive distortion viewing is the difficulty of focus targeting [4], a term used to describe the placement of the focus exactly where intended. The problem arises because increasing magnification renders control more difficult, and the maximum magnification appears exactly at the point of interest in the middle of the focus. This difficulty may be viewed as a variant of a general trade-off between speed and accuracy that also appears in other related settings [5].

Methods of addressing the focus targeting difficulty include speed dependent auto zoom (SDAZ) [6], speed coupled flattening (SCF) [4], and three techniques introduced by Appert et al [2], which they call speed, key and ring.

Speed is related to SCF and SDAZ, while key and ring discretely change the slope of the C-D function on detection of a key press and on the cursor reaching the edge of the focus ring respectively.

Leung and Apperley [7] reviewed distortion-oriented presentation techniques up to 1994, including a table of one-dimensional transformation functions T and magnification functions M. Magnification is the first derivative of transformation and these functions are usually both normalized to the domain [0,1]. In a two-dimensional setting, T and M may be interpreted as radial functions T(r) and M(r).

The known methods for facilitating focus targeting in the context of distortion viewing are all based either on cursor speed, or on spatial discontinuities in the interpretation of cursor movements. Discontinuities may appear jarring to the user, and position is more suitable for some control applications than speed. Thus there remains a need in the art for a method that is both continuous everywhere and that depends on position only. The present invention is intended to fill this gap.

GENERAL DESCRIPTION OF THE INVENTION

The present invention eases the focus targeting difficulty through focus demagnification. This is achieved by changing the magnification function characterizing the distortion by introducing a focal dip, that is a narrow minimum exactly at the position of the previously existing maximum.

While it may seem counterproductive to reduce the magnification function exactly at the point of most interest, the problem created by this is overcome by double lensing. This term will be used to describe the technique where one ("ground") lens is applied to the background, while another ("figure") lens is applied to the objects in the foreground.

The ground lens can thus be designed with navigation in mind, while the figure lens is designed to scale each object to utilize the space available for its presentation, after distortion of the background space. The separation assumed here between the background space and the objects in the foreground, limits the application of the invention to cases where a discrete set of objects are embedded in a (bounded) continuous space.

Examples of discrete objects in continuous spaces include places of interest on a geographical map, trees or graphs represented in Euclidean spaces, and stars or galaxies in the sky. The discrete objects need not be point objects, as long as no two objects occupy exactly the same position.

One perspective on double lensing is that the magnification of the space is performed according to the magnification function with focal dip, but that the scaling of the objects is done with reference to the associated transformation function. This means that object scaling is done based on the integration of the space magnification over the distance from the focal point, in which the effect of the focal dip is overwhelmed by the magnification over the rest of the function.

The coordinated combination of focus demagnification with double lensing results in a display of images enlarged around the focal point, but easily stabilized and selected interactively via focus targeting. During navigation, the user experiences images that seem to rush in towards the focal area, to slow down individually as if to take a bow on the stage, and then to speed off in the opposite direction after leaving the limelight. Images removed from the focal point may exhibit jitter at high magnification factors, but the overall result is a satisfactory and fluid solution to the problem of focus targeting during distortion viewing.

According to the invention there is provided a method for human-computer interaction (HCI) on a graphical user interface (GUI), which includes the steps of:

displaying a plurality of objects positioned in relation to each other and in relation to the display window;

determining user input;

distorting at least one of the position relations according to a magnification function with a focal dip, where the focal position of the magnification function is controllable by the user input; and updating the distortion whenever the relevant user input changes.

The method, in the step of updating the distortion whenever the relevant user input changes, may include the following step:

rendering at least one object in the view with a size related to a measure of the space which is available to it after the position distortion.

The objects are discrete or discretized items like destinations on a map, pixels in a picture, vertices of an abstract tree, grid points in a space, etc. Even though these objects may have or represent something with extension in the space, they are nevertheless considered to be positioned at a single point in the space, which point is preferably distinct from that of every other object. The method may include the step of discretizing items.

The relations may preferably be distorted in a non-linear way.

The magnification function is preferably a non-negative, slowly changing, continuous function, with a flat or broad maximum around a single focal point, decreasing in all directions away from the focal point, like a Gaussian bell function. Magnification function values larger than one enlarge the view, while values smaller than one diminish the view.

The focal dip or a dip in the magnification function at the position of a focal point is a local minimum, preferably narrow in comparison to the broad maximum inside of which it is inserted. The dip can be slight (i.e. somewhat diminishing the magnification), substantial (i.e. reaching a magnification as low as one) or total (i.e. reaching a magnification of zero). While the insertion of a focal dip may be surprising, its effect is local, and the rest of the magnification function remains of an ordinary kind such as is known to anyone skilled in the art.

It will further be understood that a magnification function with a focal dip has the unusual effect of demagnifying the image exactly around the focus point. The method may therefore be described as focus demagnification. The utility of focus demagnification lies in addressing a well-known problem with navigation of distortion-oriented visualisation, namely the fact that focus targeting is difficult.

The size or diameter of the focal dip should preferably be smaller than the shortest distance between any two objects before the distortion, to ensure that the effect of focus demagnification is sufficiently local to affect only one object at a time, provided that the object is near the focal point.

The computer representation of the magnification function, and therefore of the distortion mapping, may be changed by varying the values which influence any or all of: the overall shape of the function, the position of the focal point, the degree of magnification at the focal point, the size and the depth of the focal dip, etc. What is preferably not changed, is the position of the dip relative to the focal point.

Where the method specifies that a display relation is distorted in accordance with a magnification function with a focal dip, it includes using an indirect specification of such a magnification function.

One way of indirectly specifying a magnification function is to specify a transformation function instead, which yields the magnification function by mathematical differentiation.

Another way of indirectly specifying a magnification function is to specify a distortion function instead, which yields the magnification function by mathematical integration.

Another way of indirectly specifying a magnification function is to specify the displacement of objects, the effect of which is the same at those object positions as that of the application of some magnification function.

The space which is available for rendering an object may be limited by the positions of the objects in its neighbourhood.

It will be appreciated that in distortion viewing as commonly practised, objects are rendered with a size determined by the values of the magnification function around its position, thereby distorting the object and the space by the same amount. The present method deviates from this, by scaling objects according to the space available to them after distortion of the position relations, that is, in accordance with the space transformation function instead of the space magnification function.

It will thus be understood that this extended method applies one magnification function to the background space, and another, different magnification or scaling factor to each object embedded in the space. The extended method may therefore be described as double lensing. The utility of double lensing lies in addressing an undesirable side effect of focus demagnification, which appears when the same magnification function is used for both the space and the objects, namely the diminished size of an object at or close to the focal dip. Preferably, the space will be distorted non-linearly, while the objects will be scaled linearly.

It will be understood that the objects may be scaled and rendered in any convenient sequence. However, it is preferable to start scaling with the object closest to the focal point and proceed to the furthest one, to allow maximization of the rendered size of the objects in focus. Rendering is preferably performed in the reverse sequence, to allow objects close to the focal point to end up on top, in the case of occlusion.

It will be understood that other properties of the objects, like colour and transparency, may be used to give them prominence and to emphasize their relative importance.

The invention also extends to a device for human-computer interaction (HCI) on a graphical user interface (GUI), which device is configured to:

display a plurality of objects positioned in relation to each other and in relation to the display window;

determine user input;

distort at least one of the position relations according to a magnification function with a focal dip, where the focal position of the magnification function is controllable by the user input; and update the distortion whenever the relevant user input changes.

The device is further configured to render at least one object in the view with a size related to a measure of the space which is available to it after the position distortion.

DETAILED DESCRIPTION OF THE INVENTION

The following detailed discussion defines, illustrates, and exemplifies the concept of a magnification function with a focal dip, in accordance with the invention. The corresponding transformation function is shown in every case.

Sarkar & Brown Transformation and Magnification Functions

The elegant and widely used fish-eye view of Sarkar and Brown (S&B) [8] has a transformation function given as the ratio of two linear functions. For the one-sided case, the relevant functions are defined by $$T_{SB}(x) = \frac{(1+d)x}{1+dx} \text{ for } 0 \leq x \leq 1 \text{ and}$$

$$M_{SB}(x) = \frac{1+d}{(1+dx)^2} \text{ for } 0 \leq x \leq 1.$$

The S&B transformation function has a sigmoidal shape, concave for positive values of x (it will not hold water falling from above). It is shown in comparison with the identity transformation, which takes the form of a diagonal line. The magnification function reaches its maximum value of d+1 at the origin or focal point, with a monotonic decrease away from it. The distortion function (not shown) is the first derivative of the magnification function. It is discontinuous, with the discontinuity corresponding to the "sharp point" at the focus of the magnification function.

Two-Piece Functions Changing at a Cross-Over Point

Focus demagnification is achieved by using one-sided functions consisting of two pieces. A convex piece is introduced into the transformation function for values of x between zero and some cross-over point $x_c$, and the concave S&B transformation function is retained for the piece where x ranges between $x_c$ and one. The two main issues to be decided are the value of $x_c$ and the shape of the convex piece.

One approach is to make $x_c$ data dependent. If its value is set equal to the smallest distance between any two of the discrete objects, the demagnification will always be substantially limited to the space surrounding the object currently in focus, while leaving the positions of the other objects unaffected by demagnification. If the focus falls between the two closest objects, both will be affected, which is appropriate for such a transient situation. In cases where the objects are placed on a grid, the value of $x_c$ will thus be equal to the cell width.

Two-Piece Functions: S&B with Lambertian Dip

The convex function may be chosen in such a way that the magnification equals one at the focus, while the transformation function remains continuous at the point $x_c$. In this case, the object is exactly as easy (or as difficult) to target as it would have been without any distortion, even as the space around it is distorted. This can be achieved with the product-exponential or Lambert convex function:

$$T_L(x) = \begin{cases} xe^{kx} & 0 \le x < x_c \\ T_{SB}(x) & x_c \le x \le 1 \end{cases} \text{ and}$$

$$M_L(x) = \begin{cases} (1+kx)e^{kx} & 0 \le x < x_c \\ M_{SB}(x) & x_c \le x \le 1 \end{cases}.$$

Continuity of T(x) at $x_c$ gives k as a function of d and $x_c$:

$$k = \frac{1}{x_c} \ln\left(\frac{1+d}{1+dx_c}\right).$$

For the two-sided two-piece functions with the concave piece given by S&B with d=5, the convex piece by the Lambert function and the cross-over point chosen as $x_c$, the transformation function is continuous, while the magnification function has discontinuities at $\pm x_c$. The dip in the magnification function resulting from the convex piece is essential for focus demagnification, while the discontinuity is not. The cross-over value of 20% chosen for illustration is fairly large, and assumes that the objects are not too closely spaced. A value of 2% and a diminished discontinuity is more likely in a typical case with a large number of objects.

The transformation function is a sigmoidal function modified in the middle by another sigmoidal function, reflected in the diagonal line and rescaled. This drastically changes the slope at the origin, and gives discontinuities in slope where the pieces meet. These slope discontinuities at $\pm x_c$ in the transformation function show up as discontinuities in value of the magnification function. The magnification function shows the desired local minimum value of one at the origin.

Two-Piece Functions: S&B with Power Function Dip

The convex function may instead be chosen such that the magnification decreases to zero at the focus point, with continuity of transformation at $x_c$ as before. Zero magnification means eliminating some range entirely from view. If only a single point is removed from a continuous space however, it will hardly be noticeable. Distortion viewing in general relies on compression of regions outside the focus area, but this proposal would result in an unusual compression around the middle of the focus area. It makes the object even easier to target interactively than without distortion.

Zero magnification may be achieved by using power functions for the convex piece, with values of the power m larger than one:

$$T_m(x) = \begin{cases} a_m x^n & 0 \le x < x_c \\ T_{SB}(x) & x_c \le x \le 1 \end{cases} \text{ and}$$

$$M_m(x) = \begin{cases} ma_m x^{n-1} & 0 \le x < x_c \\ M_{SB}(x) & x_c \le x \le 1 \end{cases}$$

The coefficient $a_m$ follows from continuity of transformation at $x_c$:

$$a_m = \frac{1}{x_c^{(m-1)}} \left(\frac{1+d}{1+dx_c}\right).$$

The value of the free parameter m need not be an integer. Any real m>0 will work, but the easiest case to calculate is probably m=2

The slope of all power functions with m>1 is zero at the origin, implying that the magnification at the focus will be zero as desired. For values of m<1, the magnification at the focus would tend to infinity, creating extreme difficulty with focus targeting, even worse than with the original Sarkar & Brown function. This range of m should therefore be used only if the goal is to make targeting the objects nearly impossible. When m=1, the power function is a straight line (implying no magnification). The family of power functions therefore offers a discrete set of three magnification factors at the focus: zero, one and infinity.

Two-Piece Functions: S&B with Reflected & Rescaled S&B Dip

A reflected and rescaled Sarkar and Brown function in the role of the convex function was inspired by the realization that the dip in the transformation function is a reversed miniature version of itself. A new free parameter c is introduced, similar to d, but applicable only inside the dip. The constraint on the rescaling, already incorporated in the following formulation, is to yield continuity at $x_c$:

$$T_r(x) = \begin{cases} \dfrac{(1+d)x_c x}{(1+dx_c)[cx_c + (1-c)x]} & 0 \le x < x_c \\ T_{SB}(x) & x_c \le x \le 1 \end{cases}$$

and $$M_r(x) = \begin{cases} \dfrac{c(1+d)x_c^2}{(1+dx_c)[cx_c + (1-c)x]^2} & 0 \le x < x_c \\ M_{SB}(x) & x_c \le x \le 1 \end{cases}.$$

The value of c would be one or larger in ordinary use, as values between zero and one yield magnification functions with a bump instead of a dip.

There is a symmetry between the equations for magnification at the focus and at the crossover point, not surprising since an adaptation of the Sarkar & Brown function itself was used for the convex part:

$$M_r(0) = \frac{1+d}{1+dx_c} \cdot \frac{1}{c} \text{ and } M_r(x_c) = \frac{1+d}{1+dx_c} \cdot c.$$

The magnification at the focus is inversely proportional to the free parameter c, which allows its value to be adjusted continuously in the range zero to infinity. The reflected and rescaled Sarkar and Brown convex function thus offers an advantage above the power convex function.

The invention is now described by way of examples with reference to the accompanying drawings.

In the drawings,

FIG. 1 shows schematically a distortion-based visualization loop with focus demagnification;

FIG. 2 shows an undistorted display of an arrangement of objects on a 18×25 rectangular grid;

FIG. 3 shows a distorted display of an arrangement of objects on a 18×25 rectangular grid, with the distortion based on equation (E1.1), with c=20, d=20 and dip radius equal to 7% of the radius of distortion;

FIG. 4 shows schematically a distortion-based visualization loop with focus demagnification and double lensing;

FIG. 5 shows an undistorted display of an arrangement of album covers on a 12×13 rectangular grid;

FIG. 6 shows a distorted display of an arrangement of album covers on a 12×13 rectangular grid, with the space distortion as in Figure E1-3, and the object scaling based on equation (E2.1b);

FIG. 7 shows schematically 3D control of focus demagnification and double lensing. Two dimensions control focus targeting, while the third controls the strength of magnification;

FIG. 8 shows a screen shot of an undistorted display arrangement of photos on a 15×20 rectangular grid;

FIG. 9 shows interaction with 3D input via a Leap Motion Controller (visible as the small box with the blue connector), resulting in a distorted display (Method: S&B+Lambert, m=4, q=1.5, focal dip calculated);

FIG. 10 shows a screen shot of the distorted display shown in FIG. 9;

FIG. 11 shows interaction with 3D input, resulting in a distorted display of an arrangement of photos, where the finger moved closer to the screen relative to the position shown in FIG. 9 (Method: S&B+Lambert, m=6, q=1.5, focal dip calculated);

FIG. 12 shows a screen shot of the distorted display shown in Figure E3-5 Note that the photo in the focus is larger, and the sizes of the photos surrounding it are larger too, compared to FIG. 10; and FIG. 13 shows a further example of the use of a magnification function.

EXAMPLE 1. IMPROVED FOCUS TARGETING BY FOCUS DEMAGNIFICATION

Refer to FIG. 1 for a diagram. In this first example of the invention, the method for human computer interaction (HCI) on a graphical user interface (GUI), includes the step of displaying a plurality of objects positioned in relation to each other and in relation to the display window. The objects in this example are represented as small squares positioned on a regular two-dimensional grid of points as shown in FIG. 2, and the grid itself is centred on the display. The initialization is done without distortion, and this undistorted configuration is retained in computer memory as the persistent space 12 shown in FIG. 1.

The method also includes the step of determining user input. The example makes use of a touch screen device like a tablet computer, and the user input is the coordinates $(X_t, Y_t)$ of the centre point of the area where the user touches the screen, which doubles as the control space 10.

The commonly used rectangular coordinates (X,Y) of any point P may be converted to polar coordinates (R,θ), where $$R=\sqrt{X^2+Y^2} \text{ and } \theta=\tan^{-1}(y/x).$$

Given the position F of a focal point with coordinates $(X_f, Y_f)$, and the radius of distortion $R_s$ around F, the normalized relative radial distance r from any point P to the focal point F may be calculated as $$r = \frac{\sqrt{(X-X_f)^2 + (Y-Y_f)^2}}{R_s}.$$

The method also includes the step of distorting at least one of the position relations according to a magnification function with a focal dip, where the focal position of the magnification function is controllable by the user input. The distorting in this example is performed with a distortion mapping 11, which maps points from the persistent space 12 to a mapped space 13, which serves as the buffer in computer memory for the display 14. The distortion mapping 11 is specified by the following transformation function of r:

$$T(r) = \begin{cases} \dfrac{(1+d)r_c r}{(1+dr_c)[cr_c + (1-c)r]} & 0 \le r < r_c \\ \dfrac{(1+d)r}{1+dr} & r_c \le r \le 1 \\ r & r > 1 \end{cases} \quad (E1.1)$$

Applying the distortion mapping 11 to points in the persistent space 12 which represent the positions of two or more objects, results in distorting the position relation between the objects involved, as the relation appears in the mapped space 13 and the display 14.

The magnification function corresponding to the distortion mapping 11, which may be obtained from (E1.1) by mathematical differentiation with respect to r, is $$M(r) = \begin{cases} \dfrac{c(1+d)r_c^2}{(1+dr_c)[cr_c + (1-c)r]^2} & 0 \le r < r_c \\ \dfrac{(1+d)}{(1+dr)^2} & r_c \le r \le 1 \\ r & r > 1 \end{cases} \quad (E1.2)$$

In agreement with the requirement of the distorting step, this magnification function has a focal dip, which shows up as a minimum at r=0. Points with r>1 fall outside the range of the distortion.

In order to make the focal position of the magnification function controllable by the user input, this example establishes a relation between the user touch coordinates $(X_p, Y_p)$ and the coordinates $(X_f, Y_f)$ of the focal point, as follows. The touch screen device provides a tight connection between the control space 10 and the display space 14. The undistorted or linear mapping from the persistent space 12 through the mapped space 13 to the display space 14 may be inverted to generate coordinates representing the user touch in the persistent space 12. The focal point coordinates in the persistent space 12 is then made equal to the user touch coordinates in that space, or linked to it by a constant offset.

The linear mapping is then used in the forward direction to map the focal point F in the persistent space 12 to the image point $F_d$ with coordinates $(X_{df}, Y_{df})$ in the mapped space 13. In this example with the touch screen, the linear mapping is the identity function $T_i(r)=r$ with corresponding $M_i(r)=1$.

$F_d$ is called the image of F under the linear transformation, because the linear transformation maps F to $F_d$. The scaling factor of the linear transformation determines the size of the radius of distortion $R_{sd}$ in the mapped space 13.

The position of every object in the persistent space 12 is then transformed according to equation (E1.1), to yield the coordinates $(T(r), \theta)$, where $T(r)$ is the normalized relative radial distance with respect to $F_d$ in the mapped space 13. This distance may be denormalized:

$$R_d = R_{sd} T(r).$$

Now the rectangular coordinates $(X_d, Y_d)$ of the point Q, which is the image under $T(r)$ of point P, can be calculated as $$X_d = X_{df} + R_d \cos\theta \text{ and } Y_d = Y_{df} + R_d \sin\theta,$$

and the corresponding object can be represented at point Q in the mapped space 13. The angle $\theta$ remains unchanged by the distortion mapping $T(r)$.

The method also includes the step of updating the distortion whenever the relevant user input changes. As the display is initially undistorted, the first detection of touch is used to effect a discrete change in the form of the distortion mapping 11 from the identity transformation to the one given in equation (E1.1).

When the user input changes, the focal point F and therefore the distortion mapping 11 depending on it is changed. The mapping 11 is then applied to the contents of the persistent space 12, the result represented in the mapped space 13, and displayed on the display hardware 14. An example of such a display is shown in FIG. 3. Notice the large total space available for the object near the focus, even though all the objects are still displayed.

User control of the touch coordinates $(X_t, Y_t)$ has the effect of activating the distortion and moving its focal point around, although a static image like FIG. 3 cannot convey the interactive focus targeting, which poses the essential difficulty solved by the current invention.

The tablet hardware is fast enough to generate the illusion of continuous movement of a distortion lens over the grid. Breaking finger contact with the touch screen deactivates the distortion again and returns the computer to rendering an undistorted grid.

It will be appreciated that other aspects of the distortion mapping 11 may also be changed interactively based on multi-touch input. In particular, the strength of the distortion or magnification factor, dependent on c and d in equations (E1.1) and (E1.2), may be controlled by a second finger touching the touch control 10. With different hardware, e.g. three dimensional input, two dimensional focus targeting as well as control of the strength of distortion may be jointly controlled by moving a single point in three dimensions.

When the distortion mapping 11 is replaced by another one having a magnification function without the focal dip, the user finds focus targeting difficult or even impossible, especially for cases with a large magnification factor. Once the focal dip is restored, focus targeting becomes not only possible, but easy. This clearly illustrates the utility of the method. However, it is difficult to render the essentially interactive effect with static images, or even with a video of someone else performing the control. It has to be experienced at first hand.

Further utility may be obtained by triggering some action on breaking finger contact. For example, the easier focus targeting allows the user to adjust an initial, crudely aimed ballistic movement, by performing control based on the enlarged visual feedback from the distortion viewing.

It will be appreciated that many different distortion mappings 11 may be found which include a focal dip in their magnification function, and that equations (E1.1) and (E1.2) constitute but an illustrative example.

Two more examples of distortion mappings follow, specified by their distortion functions, noting that their magnification functions indeed do have focal dips. The first is the power function:

$$T_m(r) = \begin{cases} \frac{1}{r_c^{m-1}} \left(\frac{1+d}{1+dr_c}\right) r^m & 0 \leq r < r_c \\ \frac{(1+d)r}{1+dr} & r_c \leq r \leq 1 \\ r & r > 1 \end{cases}$$

and the second the product exponential or Lambert function:

$$T_L(r) = \begin{cases} r e^{\left(\frac{r}{r_c} \ln\left(\frac{1+d}{1+dr_c}\right)\right)} & 0 \leq r < r_c \\ \frac{(1+d)r}{1+dr} & r_c \leq r \leq 1 \\ r & r > 1 \end{cases}.$$

These equations have been implemented as options in the application of the current example, and they perform well.

EXAMPLE 2. DOUBLE LENSING AS A REMEDY FOR A DRAWBACK OF FOCUS DEMAGNIFICATION

Refer to FIG. 4 for a diagram. In the second example of the invention, the method for human computer interaction (HCI) on a graphical user interface (GUI), includes all the steps mentioned in Example 1, and in the same way. Example 1 is hereby incorporated by reference. There is an important drawback to the method as illustrated by Example 1, which is that focus demagnification, if applied to the objects as well as to the space, will lead to a display where the objects at the focus of the distortion mapping will be small instead of large. This is remedied by the following augmentation.

As stated in the general description, the method, in the step of updating the distortion whenever the relevant user input changes, may include the following step: rendering at least one object in the view with a size related to a measure of the space which is available to it after the position distortion.

In this example, instead of using the distortion mapping 11 to determine both the position and the scale of each object, it is only used to determine the position. The scale at which each object is rendered is instead determined during view generation 15, which is inserted as a transformation from the mapped space 13 to the display 14. The scale is determined as follows.

On an infinite rectangular grid, every object would have four neighbouring positions. If an object's position is at point P the distance between P's image Q and the images in the mapped space 13 of these four positions may be denoted by $\Delta X^+$, $\Delta X^-$, $\Delta Y^+$ and $\Delta Y^-$. Even if no object is actually present at a certain grid position, that position can still be calculated, before and after distortion; i.e. both in the persistent space 12 and in the mapped space 13.

A measure of the space available to a particular object in the mapped space 13, is calculated in this example as the average of the distance to its four neighbouring positions, either the arithmetic average $d_a$ given by $$d_a = \frac{|\Delta X^+| + |\Delta X^-| + |\Delta Y^+| + |\Delta Y^-|}{4}, \quad \text{(E2:1a)}$$

or by the geometric average $d_g$ given by $$d_g = (|\Delta X^+| \cdot |\Delta X^-| \cdot |\Delta Y^+| \cdot |\Delta Y^-|)^{1/4}. \quad \text{(E2.1b)}$$

The object closest to the focal point F is scaled to a radius of, say 80% of its average neighbourly distance, while other objects are scaled to 50% of theirs. This ensures that each object uses a substantial part of the space available to it, but it is not a guarantee that overlap will always be avoided.

In this example, a rectangular album cover or blank image is associated with each object. With the distortion mapping 11 equal to the identity function, the album covers on the undistorted grid is shown in FIG. 5.

A screen shot during an example of touch interaction, with scaling according to equation (E2.1b), is shown in FIG. 6. While the interactive advantage of easy focus targeting is retained, it is apparent that the drawback of small images at the centre of the distortion range has been overcome.

The ability to separate the representation of the background space ("ground"), including the positions of the objects, from the representation of the objects in the foreground ("figure") is a precondition for this to work.

Note the overlap between object images, especially in the region where the space is compressed. The right order of rendering is important to get this right, starting at the object furthest from the focus, and working back to the nearest.

This example illustrates the native setting for the method which combines focus demagnification with double (figure & ground) lensing. The setting includes:

a discrete set of objects
embedded in a continuous space
with a focused distortion
which can be interactively controlled.

As in the Example 1, focus demagnification is used to ease focus targeting. Unlike Example 1, the undesirable side-effect of focus demagnification is here overcome by separate, linear "figure" lenses, in addition to the non-linear "ground" lens. The combination is referred to as double lensing.

EXAMPLE 3. THREE DIMENSIONAL CONTROL OF FOCUS DEMAGNIFICATION AND DOUBLE LENSING

In the third example of the invention, the method for human computer interaction (HCI) on a graphical user interface (GUI), is applied in a way similar to the second example, but with three-dimensional control. Input is obtained with the Leap Motion Controller (www.leapmotion.com), represented as the 3D Control block 10 in FIG. 7. Two input dimensions (x and y) control the focus targeting and the third (z) controls the strength of magnification.

As stated in the general description, the method, in the step of generating a view of the whole or a part of the mapped space and displaying the view, may include the following step: rendering each object in the view at a scale proportional to a measure of the total space which is available to it, after the displacement of its position and the positions of its surrounding objects by the distortion mapping.

In the current example, this step is performed during the view generation 15 which is based on the mapped space 13, which view is to be displayed on the display hardware 14. Instead of using the distortion mapping 11 to determine both the position and the scale of each object, it is only used to determine the position. The scale at which each object is rendered is instead determined in the following way.

Each display object has indices i and j associated with its row and column respectively. The radial distance in the (x, y) plane from the object ij to the user pointing object, normalized by the radius of the lens, is denoted by $r_{ij}$. The maximum size $W_{ij}$ for each object is calculated as $$W_{ij} = \frac{mW_0}{1 + (m-1)r_{ij}^q}, \quad \text{(E3.1)}$$

where m is a magnification factor, $W_0$ is a constant common to all objects, and q is a free exponent. The display size $W'_{ij}(z)$ is a function of the third dimension z, where the function increases with diminishing z. The maximum in-range distance of z is normalized to 1, and the function is chosen to have boundary conditions $W'_{ij}(0) = W_{ij}$ calculated according to equation (E3.1), and $W'_{ij}(1) = 1$. The linear function that meets these conditions and is used in this example, is $$W'_{ij} = W_{ij} + (1 - W_{ij})z. \quad \text{(E3.2)}$$

The objects in this example are photographs. With the distortion mapping 11 equal to the identity function, the photos on the undistorted grid are shown in FIG. 8. This is what is displayed when the user's hand is out of range of the input device 10.

FIG. 9 is a photo of the prototype system during user interaction. The Leap Motion Controller 10 is visible as a small black box with a blue connector at the bottom of the picture. The user's finger position is measured in three dimensions, and used for distorting the display according to the invention's method of focus demagnification and double lensing, using equations (E3.1) and (E3.2). The resulting display appears in FIG. 9, but it is also shown in the screen shot of FIG. 10.

Note the overlap between object images, especially in the region at the edge of the lens, where the space is compressed. The right order of rendering is important to get this right, starting at the object furthest from the focus, and working back to the nearest.

When the user moves his finger closer to the screen, the finger coordinate in the third dimension (z) diminishes, leading to a larger display size for objects near the focus, according to equation (E3.2). Such a situation is depicted in FIG. 11, where the value of magnification factor m has also increased due to the change in z. The corresponding screen shot of FIG. 12 again affords a clearer view of the result of the interaction shown in FIG. 11. The photo in focus is larger, but also the ones in the first circle around it.

While the dynamic effects of the focus demagnification step that allows easier focus targeting are difficult to convey with static images, it should at least be clear that the double lensing step has succeeded in compensating for the effect of the demagnification on the items at and around the focus.

The availability of three control dimensions means that the user can control which object is in focus with the same finger that controls at what magnification that object appears. This eases the viewing and browsing of and selection from a large set of photographs on a relatively small screen.

The method illustrated in this example can also be applied to GUI icons or other interactive images. The boundary conditions and the equations given, are meant to illustrate the method, and not to limit its scope.

EXAMPLE 4. SUGGESTING A FOCAL DIP

The next example is a fragment quoted from PCT/ZA2012/0000059, filed by the same applicant as for this patent application. Refer to FIG. 13.
"The function family used for calculating relative angular positions may be sigmoidal, as follows. $\theta_{ip}$ is the relative angular position of interactive object 18.$i$ with respect to the line connecting the reference point 20 to the pointer's coordinates 12. The relative angular position is normalized to a value between $-1$ and $1$ by calculating $$u_{ip} = \frac{\theta_{ip}}{\pi}.$$

Next the value of $v_{ip}$ is determined as a function of $u_{ip}$ and $r_p$, using a piecewise function based on $ue^u$ for $0 \leq u < 1/N$, a straight line for $1/N \leq u < 2/N$ and $1-e^{-u}$ for $2/N \leq u \leq 1$, with $r_p$ as a parameter indexing the strength of the nonlinearity. The relative angular position $\varphi_{ip}$ of display coordinates 16.i, with respect to the line connecting the reference point 20 to the pointer 14 in 10.2, is then calculated as $\varphi_{ip} = \pi \Box v_{ip}$. FIG. 13 shows the pointer 14 in the neutral position with the pointer coordinates 12 coinciding with the pointer reference coordinates 20."

The three equations in this example together describe a one dimensional sigmoidal transformation function, giving $v_{ip}$ as a function of $u_{ip}$ and $r_p$. Any transformation function can be differentiated to yield the associated magnification function. The magnification function in this case would have a minimum around the u=0 focal position, which suggests a focal dip.

REFERENCES

[1] Furnas, G W, "*The FISHEYE view: a new look at structured files*," Bell Laboratories Technical Memorandum #81-11221-9, Oct. 12, 1981.
[2] Appert, C, Chapuis, O, & Pietriga, E, "*High-Precision Magnification Lenses*," ACM CHI, 2010.
[3] Cockburn, A, Karlson, A, and Bederson, B B, "*A review of overview+detail, zooming, and focus+context interfaces*," ACM CSUR Vol. 41 No 1, 2008, pp 1-31.
[4] Gutwin, Carl, "*Improving Focus Targeting in Interactive Fisheye Views*," CHI Letters, Vol. 4 No 1, 2002, pp 267-274.
[5] Mackinlay, J D, Card, S K & Robertson, G G, "*Rapid Controlled Movement Through a Virtual 3D Workspace*," ACM Computer Graphics, Vol. 24 No 4, August 1990, pp 171-176.
[6] Igarashi, T & Hinckley K, "*Speed-dependent automatic zooming for browsing large documents*," Proc. UIST '00, ACM, 2000, pp 139-148.
[7] Leung, Y, and Apperley, M, "*A Review and Taxonomy of Distortion-Oriented Presentation Techniques*," ACM T. CHI Vol 1 No 2, 1994, pp 126-160.
[8] Sarkar, M., & Brown, M. "Graphical Fisheye Views of Graphs. Proc. ACM CHI'92, pp 83-91.

The invention claimed is:
1. A method for human-computer interaction (HCl) on a graphical user interface (GUI), which includes the steps of:
   displaying a plurality of objects at distinct positions of a display device;
   determining input from a user;
   determining a point on the display device corresponding to the input;
   modifying positions of the display device at which at least a subset of the plurality of the objects are displayed according to a distortion function that depends on a magnification function and on a demagnification function where:
      the magnification function has a first focal point that is the point on the display device corresponding to the input and a first radius of distortion,
      the demagnification function has a second focal point that is the point on the display device corresponding to the input and a second radius of distortion, the second radius of distortion less than the first radius of distortion, and
      the distortion function is a sum of the magnification function and the demagnification function;
   displaying at least the subset of the plurality of objects at the modified positions of the display device;
   determining a change in the input;
   determining a modified point on the display device corresponding to the changed input;
   updating the first focal point and the second focal point to the modified point on the display device; and
   updating positions of the display device at which at least the subset of the plurality of the objects are displayed using the distortion function with the updated first focal point and the updated second focal point.
2. The method as claimed in claim 1, wherein the objects are discrete or discretized items and in the latter case the method includes the step of discretising items.
3. The method as claimed in claim 1, wherein the relations are distorted in a non-linear way.
4. The method as claimed in claim 1, wherein the magnification function is a non-negative, slowly changing, continuous function, with a flat or broad maximum around a single focal point, decreasing in all directions away from the focal point.
5. The method as claimed in claim 1, wherein the method uses an indirect specification of the magnification function.
6. The method as claimed in claim 5, wherein the magnification function is indirectly specified by specifying a transformation function, which yields the magnification function by mathematical differentiation.
7. The method as claimed in claim 5, wherein the magnification function is indirectly specified by specifying a distortion function, which yields the magnification function by mathematical integration.
8. The method as claimed in claim 5, wherein the magnification function is indirectly specified by specifying displacement of objects.
9. The method as claimed in claim 1, wherein the positions of the objects in the neighbourhood of an object in focus determines the space which is available for rendering the object in focus.

10. The method as claimed in claim 1, wherein objects are scaled and rendered by scaling first the object closest to the focal point, and, proceeding in order of increasing distance, to the furthest one.

11. The method as claimed in claim 1, wherein, in the case of occlusion, objects are scaled and rendered by completing the scaling, then rendering the objects, first the object furthest from the focal point, and, proceeding in order of decreasing distance, to the nearest one, to allow objects close to the focal point to end up on top.

12. The method of claim 1, wherein an object having a position modified according to the distortion function is displayed with a changed size that is directly related to a relative distance between the object and one or more objects, the relative distance modified from the modification to the position of the object according to the distortion function.

13. A device for human-computer interaction (HCI) on a graphical user interface (GUI), which device is configured to:
- display a plurality of objects at distinct positions of a display device;
- determine input from a user;
- determine a point on the display device corresponding to the input;
- positions of the display device at which at least a subset of the plurality of the displayed objects are displayed according to a distortion function that depends on a magnification function and on a demagnification function where:
  - the magnification function has a first focal point that is the point on the display device corresponding to the input and a first radius of distortion,
  - the demagnification function has a second focal point that is the point on the display device corresponding to the input and a second radius of distortion, the second radius of distortion less than the first radius of distortion, and
  - the distortion function is a sum of the magnification function and the demagnification function;
- display at least the subset of the plurality of objects at the modified positions of the display device;
- determine a change in the input;
- determine a modified point on the display device corresponding to the changed input;
- update the first focal point and the second focal point to the modified point on the display device; and
- positions of the display device at which at least the subset of the plurality of the objects are displayed using the distortion function with the updated first focal point and the updated second focal point.

14. The device of claim 13, wherein an object having a position modified according to the distortion function is displayed with a changed size that is directly related to a relative distance between the object and one or more objects, the relative distance modified from the modification to the position of the object according to the distortion function.

* * * * *

UNITED STATES PATENT AND TRADEMARK OFFICE
CERTIFICATE OF CORRECTION

PATENT NO. : 10,636,117 B2
APPLICATION NO. : 14/780162
DATED : April 28, 2020
INVENTOR(S) : Hendrik Frans Verwoerd Boshoff et al.

It is certified that error appears in the above-identified patent and that said Letters Patent is hereby corrected as shown below:

On the Title Page

Column 2, item (57) Abstract, Line 2, delete "(HC1)" and insert --(HCI)--

In the Claims

Column 14, Line 8, In Claim 1, delete "(HC1)" and insert --(HCI)--

Column 15, Line 17, In Claim 13, delete "(HC1)" and insert --(HCI)--

Column 15, Line 25, In Claim 13, before "positions", insert --modifying--

Column 16, Line 18, In Claim 13, before "positions", insert --update--

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*